Sept. 10, 1935.   R. D. MERSHON   2,014,005
ELECTRODE OR TERMINAL FOR ELECTROLYTIC APPARATUS
Filed Dec. 19, 1934   3 Sheets-Sheet 1
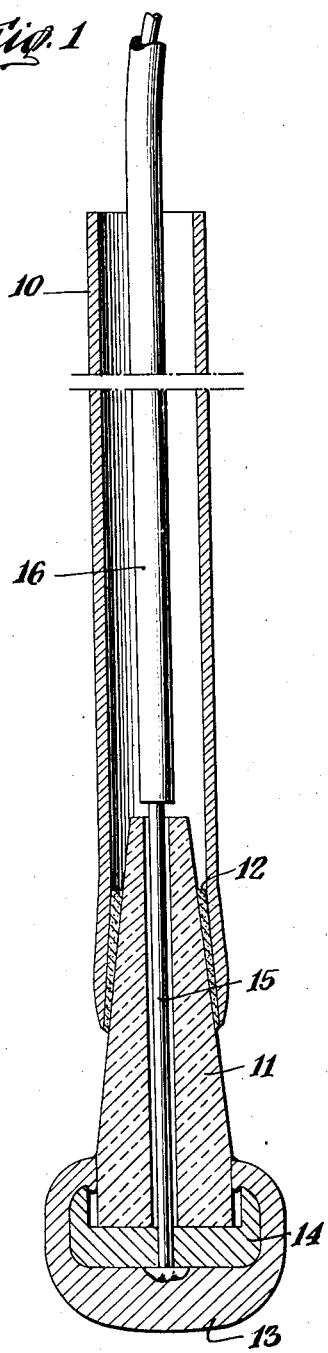
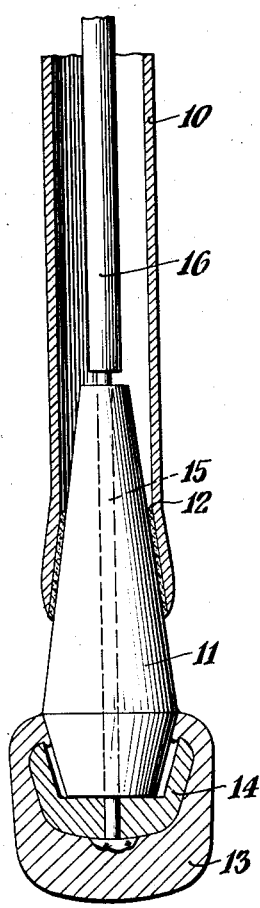
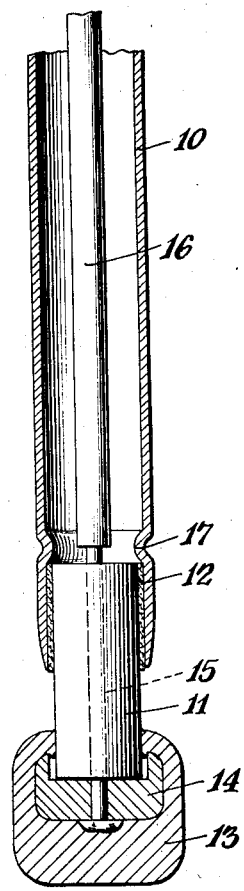
INVENTOR
R. D. Mershon
BY
Cooper, Kerr & Dunham
ATTORNEYS Sept. 10, 1935. R. D. MERSHON 2,014,005
ELECTRODE OR TERMINAL FOR ELECTROLYTIC APPARATUS
Filed Dec. 19, 1934 3 Sheets-Sheet 2

INVENTOR
R. D. Mershon
BY
Cooper, Kerr & Dunham
ATTORNEYS

Sept. 10, 1935. R. D. MERSHON 2,014,005
ELECTRODE OR TERMINAL FOR ELECTROLYTIC APPARATUS
Filed Dec. 19, 1934 3 Sheets-Sheet 3
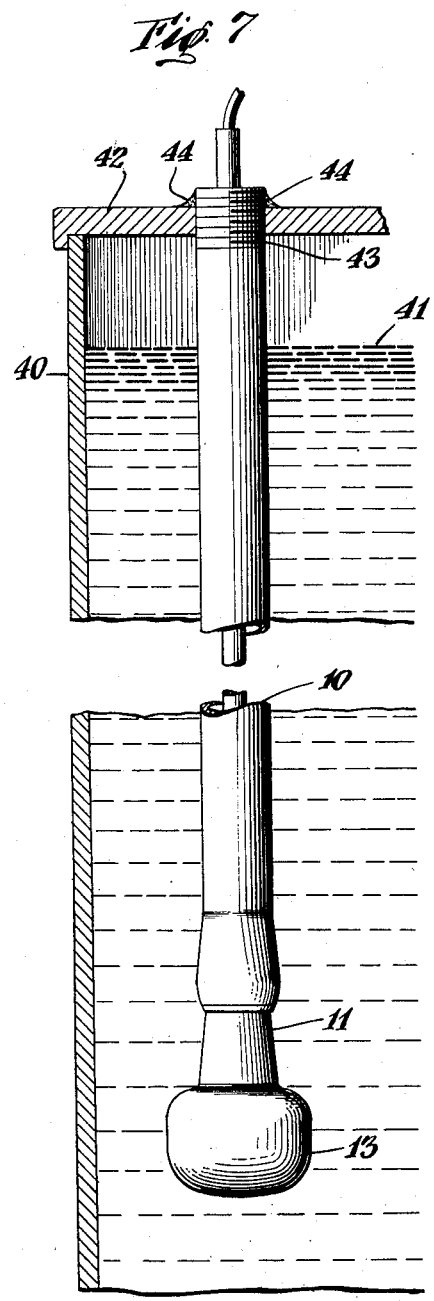
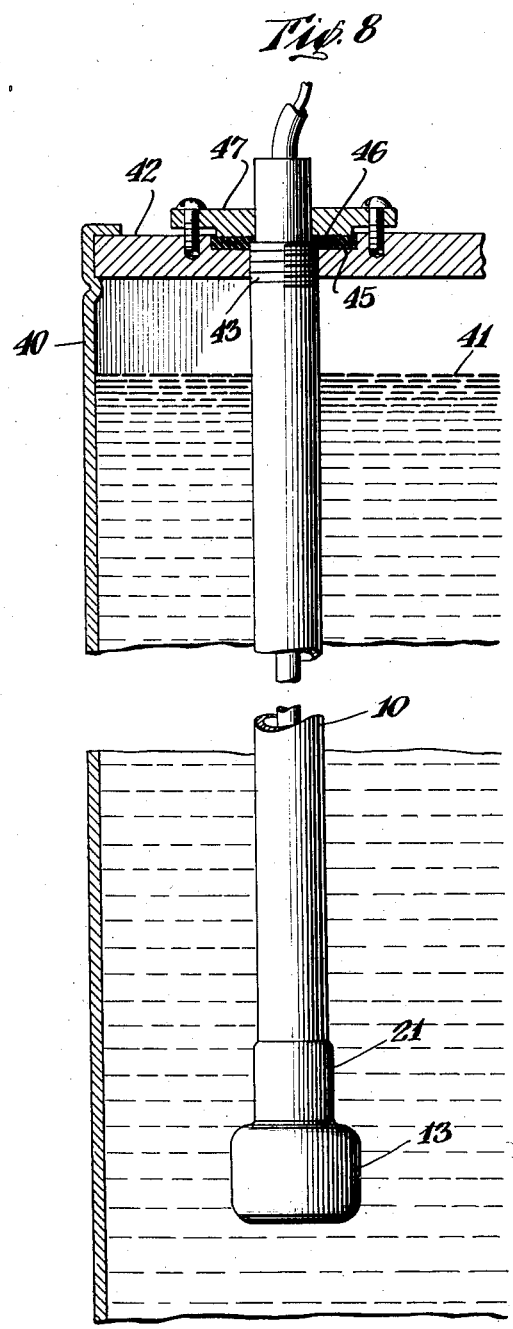
INVENTOR
R. D. Mershon
BY
Cooper, Kerr + Dunham
ATTORNEYS Patented Sept. 10, 1935

2,014,005

UNITED STATES PATENT OFFICE 2,014,005

ELECTRODE OR TERMINAL FOR ELECTROLYTIC APPARATUS

Ralph D. Mershon, New York, N. Y.

Application December 19, 1934, Serial No. 758,154

18 Claims. (Cl. 175—315)

In electrolytic devices such as condensers and rectifiers having filmed electrodes of aluminum or other metal, any filmed part extending out of the electrolyte into the air suffers more or less rapid corrosion at the surface of the electrolyte. It is therefore customary to submerge the electrodes entirely in the electrolyte; but leads of filming metal coming out of the electrolyte are subject to the attack mentioned and in the course of time must be replaced. In my prior Patent No. 1,572,404 I have described a terminal in which this corrosion is avoided. For that purpose a body of filming metal is cast or otherwise hermetically secured on the end of an insulating tube or sheath having a vitreous surface, such as a porcelain tube, and a conductor or lead (which need not be of filming metal) is brought out from said body through the tube. The filming metal on the end of the tube can then be connected to the filmed electrode, so that if the surface of the electrolyte is above the body of filming metal the latter is wholly submerged as well as the electrode to which it is connected and hence neither undergoes corrosion at the surface of the electrolyte.

The present device is a form of the invention described in my patent referred to above, and has the advantage, among others, that the tube, sheath or like part having a surface of vitreous material can be relatively short and therefore less liable to cracking or breakage in handling and in assembling the electrolytic rectifier or condenser, especially when the device is small in diameter, say a quarter or three-eighths of an inch thick. The necessary length to permit the device to extend from a point in the electrolyte, and out through the air space above in the vessel or container, is provided by a metallic tubular portion, preferably though not necessarily copper, and at the end of this portion the tube, sheath, or like part having a surface of vitreous material, is hermetically affixed. The body of filming metal is secured to the vitreous-surfaced insulating part, and is thereby spaced and insulated from direct electrical connection with the metal tube. The supporting structure can thus comprise a tube having an external metallic surface for a considerable portion of its length, and a lower surface of vitreous material, to which the electrode metal body is hermetically sealed. With the supporting device in tubular form, the lead or conductor, also preferably of copper, extends from the filming metal body through the device to the desired point of connection outside the rectifier or condenser.

To insure against electrical contact between the metal tube and the conductor or lead the latter may be covered with rubber, or other insulating material, or the interior of the metal tube around the lead may be filled with an insulating compound, or both expedients may be employed. Another advantage of the present construction may be found in the fact that where the metalic tubular part enclosing and projecting the lead is in electrical connnection with the electrolyte, such part is accordingly at the same potential as the electrolyte,—in contradistinction, for example, to a structure wherein filmed active parts extend out past the surface of the electrolyte and in contact with the latter,—and such exposed metallic tubular part may in fact conveniently and economically provide a complementary electrode for the filming metal body, as for instance the non-filmed electrode when the filming metal body is the filming electrode of a rectifier.

Referring to the accompanying drawings:

Figure 1 is a longitudinal section of an effective terminal device embodying the invention;

Figs. 2 and 3 illustrate certain modifications, partly in section;

Fig. 7 shows a portion of an electrolytic apparatus, in section, incuding a terminal device in elevation; and Fig. 8 illustrates another form of the apparatus of Fig. 7, partly in section and partly in elevation.

Figure 4:
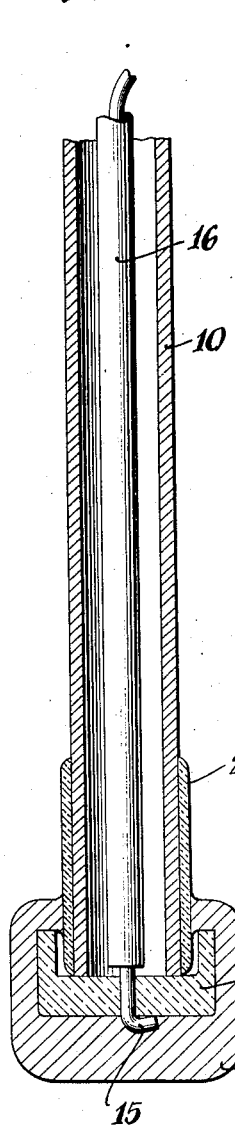
Fig. 4 is a longitudinal section of another effective form of the invention.

In Fig. 1 the metal tube is shown at 10. Preferably the tube is of copper, as I have found that copper has no deleterious effect upon the apparatus in which the device is used, but it may be of iron, nickel, or other metal, though if the device is to be made as described below the metal should not melt or soften at the fusing temperature of the vitreous material, such as the glaze slip on the porcelain part, or the vitreous enamel in other forms. In the form of Fig. 1 the metal tube is tapered on the inside at one end, as indicated, preferably with rather a long taper, conveniently formed by expanding the end of the tube, and an electrode element is fastened thereto, including a porcelain tube 11 which is tapered to fit snugly in the tapered end of the metal tube. Whether the taper of the metallic tube is made by expanding the end of the tube or by reaming or turning the interior, it is sometimes desirable to thin the tapered part or at least its edge portion to lessen any liability of breakage of the porcelain by contraction of the metal tube. Between the two is a layer of a preferably vitreous cementing material indicated at 12, with some exaggeration of its thickness. The electrode element also includes, on the protruding end of the porcelain tube, a body or cap of filming metal 13, usually of aluminum or an alloy of aluminum, in hermetic contact with the porcelain to prevent entrance of electrolyte between the two.

If the filming metal is cast on the porcelain tube or other vitreous-surfaced part, as is the preferred method of obtaining the desired hermetic joint, a reinforcing member may be employed inside of the filming metal body to resist the compression stresses due to shrinkage of the cast metal in cooling, thus relieving the vitreous-surfaced supporting portion and lessening the tendency to cracking or breakage of the latter by such pressure. In certain of the structures illustrated the reinforcement is shown in the form of a cap at the end of the tubular supporting device. In Figures 1, 2 and 3, this reinforcing part is a cap 14 composed of iron, steel, invar, or other metal which has less cooling shrinkage than has the filming metal cast over it. In some cases, as in Figs. 4 and 6, the cap 14a may be of porcelain or lavite, with special advantages as hereinafter described. The feature of a compression resisting part, however, is not claimed broadly herein, but is so claimed in my Patent No. 1,949,870.

Referring again to Fig. 1, conducting lead 15, for connection with the external circuit, extends through the two tubes 10 and 11 and through the reinforcement cap or disk 14 into electrical connection with the body of filming metal 13. The lead shown is provided with an insulating covering, indicated at 16.

The form shown in Fig. 2 differs from that of Fig. 1 only in that the end of the porcelain tube in which the body of filming metal is secured is tapered. In Fig. 3 the porcelain tube is untapered at either end. In any of these forms the tube is vitrified throughout or well glazed, so as to have at least a surface of vitreous material; or it should be so vitrified or glazed for the best results, to eliminate all possibility of electrolyte penetrating to the inner surface of the body of filming metal, for the reason that if such penetration occurs the inner surface of the metal will be filmed in the operation of the apparatus, the metal will be rapidly corroded, and the film is apt to cause the metal to separate from the porcelain.

In Fig. 4, the metal tube 10 has an insulating sheath comprising a thin adherent layer of vitreous enamel 21, which is applied as a coating around a lower portion of the tube, usually submerged in the electrolyte. Around the end of the coated metallic tube the electrode element, including cap 14a and filming metal body 13, can then be secured with outer portions of the tube, above the element, exposed for electrical connection with the electrolyte in the same manner as, for example, in Figs. 1, 2 and 3. The insulating cap 14a is preferably composed of rigid material, such as porcelain, lavite, or the like, and is disposed at the end of the coated tube, as shown. The filming metal body 13 is cast around the surface of vitreous enamel 21 and enclosing cap 14a, while lead 15 extends from the filming metal, through a suitable aperture in the lavite cap, and out through the tubular metallic part 10, such lead having an insulating cover, of rubber or the like, as at 16. It will be appreciated that the electrode metal body 13 is hermetically sealed to the enamel coating, and the latter reinforced by the underlying metallic tube 10, whereby a strong electrolyte-proof seal is provided; this feature is not claimed broadly herein but is so claimed in my Patent No. 1,949,871, the present invention being an improvement of the devices shown therein and in my above-mentioned Patent No. 1,572,404. The insulating cap 14a not only serves, if it is of rigid material, to reduce such compression stresses as the filming metal body may set up on the vitreous surface of enamel 21, but serves the further important purpose of facilitating insulation of the filming metal from the end of the metallic tube, effectively spacing these parts.

Figure 5:
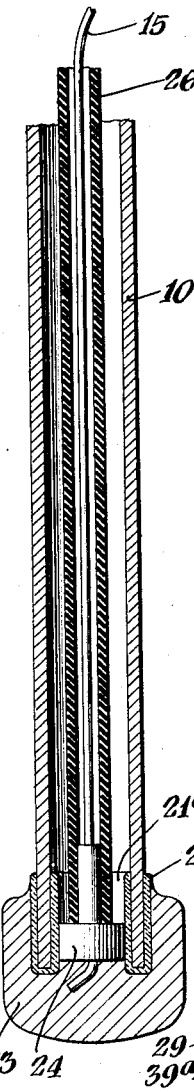
Figs. 5 and 6 show still other modifications, partly in section.
Figure 6:
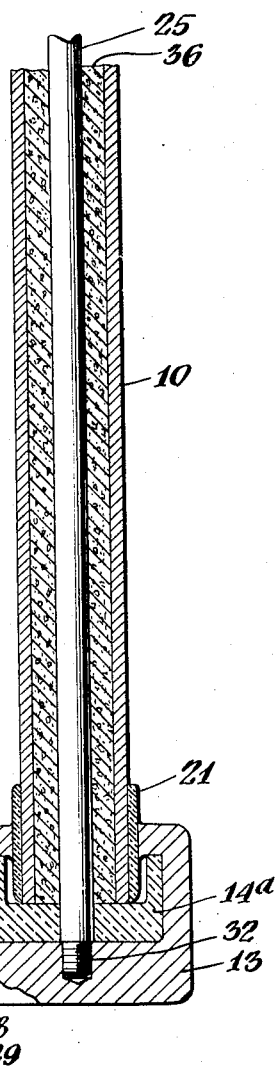

In Fig. 5, the vitreous enamel coating is carried around the lower end of the metal tube and over another part of its surface at the inside, indicated at 21a, this being an effective arrangement for insulating the end of the metal tube 10 in certain cases where an adherent or crack-proof enamel layer can be provided around the extreme end surface of the metal tube. A bushing or like part 24 of lavite or porcelain can be mounted within the enamelled part of the tube 10, as shown, so as to center the lead and to facilitate spacing and thereby insulating the filming metal from the metal tube. The body 13 of filming metal is readily applied, as by casting-on, in hermetic contact with the vitreous enamel coating 21, while the lead 15, surrounded by insulating tube 26 and extending through a central aperture (not shown) of the bushing 24, has its lower end embedded in the filming metal. In Fig. 6, the filming metal 13 is similarly applied to a surface of vitreous material provided by the enamel coating 21 at the lower end of metallic tube 10. Here the lead 25 consists of a rod which is threaded at its lower end into the filming metal body, at 32, and the interior of tube 10 may be filled with a suitable insulating cement or compound 36, for effective insulation of lead 25. If connection is desired to an anode or other electrode elements within the electrolyte, for example as disclosed in my prior Patent No. 1,572,404, various arrangements may be used, preferably such as to make the anode metallically integral with the filming metal body 13. For instance, a lug 27 (shown partly in elevation) may be cast as part of the body 13, and have a vertical slot 28 which receives a strap 29 consisting of a turned-up integral portion of anode plate 37. The side 38 of the lug is then pinched against the strap and the other side of lug (behind the strap), and the edges of the strap welded to the adjacent lug portions at 39a, 39b.

It should also be noted that in many cases if the rigid cap 14a (shown, for example, in Figs. 4 and 6) should be cracked and/or broken by the heat and/or compression incidental to assembling the structure (for instance, by casting-on the electrode metal body 13), its effectiveness is not impaired; reduction or easing of compression stress, where necessary, is still had, and more particularly, spacing and insulation of the filming metal from the end of metallic tube 10 is always maintained.

Referring more particularly to the species of the invention shown in Figs. 1, 2 and 3, a preferred method of manufacture is as follows. The part of the porcelain tube 11 which is to be secured to the metal tube 10 is coated with a vitreous material such as glaze slip, preferably of low fusing point, any of the known low-melting slips used in the ceramic industry being suitable. The two are then assembled and the porcelain tube pushed lightly home, after which the assembly is heated to the melting point of the slip, and when the latter is melted the tubes are pressed firmly together. Upon cooling, it will be found that the tubes are in effect welded to each other, making a permanent joint which is preferably hermetic. If the tubes are stood on end in the furnace the weight of the metal tube is in some cases sufficient to give the close approach to the porcelain tube, without squeezing too much of the slip out of the joint. This is one reason for tapering the tubes in the manner shown. If both are straight, as in Fig. 3, the metal tube may slide down too far unless means is provided to prevent it, as by forming a bead 17 on the inside of the metal tube. Should the weight of the latter tube not be sufficient the desired pressure may be obtained in any other way. One way is to fasten the lead (15) to the reinforcing disk 14 and run the lead up through the tubes. Then when the slip is melted a pull on the lead will draw the porcelain tube up into the other. For this purpose the lead can be held to the disk 14 in any convenient manner, as by peening it, or, if the lead is not too thick, by simply knotting it. Or if the lead is thick enough it may be threaded into the disk. The lead may extend out of the furnace through a small hole in the furnace closure, so that when the lead is pulled the copper tube, butted against the cover, will be firmly held.

It will be observed that as the porcelain tube is pressed or drawn into the tapered metal tube the fused glaze, then in a plastic condition, is squeezed into close contact with both tubes. The metal tube, as it cools, shrinks down on the glaze and is thereby put in tension, thus tending to prevent any tensile stress being exerted on the glaze in subsequent use of the device.

If the porcelain tube is unglazed it may be covered with the slip, at least on its outer surface, so that the glazing of the tube and the joining of the same to the metal tube may be effected at the same time. If the tube is already glazed, the coating of slip may be omitted, provided the layer of glaze is thick enough, when melted, to afford the desired hermetic connection with the metal tube. In either case a layer of slip may be applied to the inside of the metal tube and to the outside of the porcelain tube. In some instances, the porcelain tube can be replaced by a short enamelled metallic tube, the enamel coating being such as to provide the desired hermetic and insulating contact, particularly with the filming metal.

The body or cap of filming metal 13 can in all forms of the invention, be readily formed on the vitreous surface at the end of the tubular supporting device, such as the porcelain tube 11 or the enamel layer 21. This can be done by casting in a mold of the desired shape, the disk, cap, or bushing, 14, 14a or 24, being held in place by the lead 15. If the device is to be used in a condenser the body of filming metal may be connected to the condenser anode or to the submerged bus by a rod, wire, or strap, also of filming metal, for example as shown in Fig. 6 and described hereinabove, and the metal tube may extend out through the cover of the tank containing the electrolyte. With the lead to the body of filming metal insulated from the metal tube the terminal can in many cases be supported in the cover by expanding the tube in the opening through which it extends or by employing means such as are shown in Figs. 7 and 8, for example when the condenser anodes are mounted in a frame or cage suspended from the cover, as illustrated in my prior Patent No. 1,784,674. In the construction shown in this patent the tank, made of copper, is the cathode of the condenser and is connected to the negative side of the source of exciting voltage. If it is not desired to have the metal tubes carry any current at all they can of course be insulated from the tank cover.

The same arrangement as described above for condensers can be used in rectifiers. In some cases, however, the filming metal on the tubular supporting device can itself be a rectifying electrode, especially where the rectifying electrode can be small, for example in a rectifier for exciting an electrolytic condenser in the same electrolyte, as described in my prior Patent No. 1,889,415.

Figs. 7 and 8 illustrate electrolytic apparatus of the condenser and rectifier class, which, including electrode devices of the type described hereinabove, embody the present invention. In Fig. 7 the electrode device is of the species shown in Fig. 1, while in Fig. 8 the device is of the modified form illustrated in Fig. 4. In Fig. 7, 40 represents a wall of a vessel or tank containing an electrolyte 41 and having a cover 42, parts 40 and 42 being here shown as of metal, preferably copper as herein elsewhere explained relative to the metal surface of the tubular supporting device. The metal tube 10 of the electrode device can be expanded in a suitable aperture in cover 42, or it may be provided with screw threads as at 43 and threaded into the metallic cover. Rigidity and security of the connection with the cover can be imparted by soldering the tube and cover as at 44, in Fig. 7, and to this end it is advantageous to employ a soldering metal having a relatively low melting point which, although amply above temperatures attained during formation or use of the electrolytic device, is such that the metal tube 10 need not be heated in a way that might crack or otherwise impair the porcelain, enamel, glaze slip, or like material.

In the construction of Fig. 8, the cover plate 42 has a circular recess 45 surrounding the aperture through which the metal tube 10 extends, and a washer 46 of resilient insulating material, such as rubber, "Duprene", or the like, is disposed in the recess. A collar 47, having a part which may extend slightly into the recess 45, is then screwed down over the washer 46, compressing the latter into extremely firm grip upon the outer surface of tube 10. This arrangement provides a firm and liquid-proof seating for the electrode device in the cover; in many cases, the threaded engagement of the tube 10 with the cover 42 may be dispensed with, in either the structure of Fig. 7 or that of Fig. 8.

The tendency of compression stress exerted by casting 13 to crack or break the vitreous-surfaced material 11 or 21 of the tubular supporting device can also be lessened by using a relatively soft metal for the casting, such as pure aluminum. When the device is to be used to connect a condenser anode with the external circuit pure aluminum is desirable, but when the metal body is to be a rectifying electrode an aluminum alloy is usually better from the electrical standpoint. In many cases it is also advantageous, for example when a porcelain tube is included, to use a tapered tube and have the casting terminate at the line of greatest diameter, as in Figs. 1 and 2, for example, since it has been found that in this construction the breakage tendency is decreased.

As stated above it is in all devices highly desirable to have the joints between the electrode element or filming metal body and the vitreous material perfectly hermetic, to eliminate all possibility of electrolyte penetrating into such joints. In the case of the filming metal, this hermetic relation is best attained by casting the metal on the supporting device, but with care it is possible of attainment by accurately fitting on the vitreous surface of the device a pre-cast or otherwise pre-formed body of filming metal, shrinking it on the device if desired. In either case, especially if the part to be shrunk on the tubular device is a casting, it is desirable to soften the metal as much as possible by annealing.

This application is in part a continuation of my copending application Serial No. 710,058, filed February 7, 1934, for "Terminal devices for electrolytic condensers and rectifiers."

It is to be understood that the invention is not limited to the specific embodiments herein described but can be embodied in other forms without departure from its spirit.

I claim:

1. Electrolytic apparatus of the condenser and rectifier class, having an electrolyte, a metal containing vessel therefor having a cover, and an electrode device extending into the electrolyte, comprising a filming metal body completely submerged in the electrolyte, a lead connected to said filming metal body and extending out of the apparatus, and a tubular device adapted to protect the lead to said filming metal from access of electrolyte, said tubular device including a metal tube extending from the cover into the electrolyte and in electrical contact with the latter, and said tubular device having at its lower part a surface portion of vitreous material, and said filming metal body being secured to the tubular device in hermetic contact with the surface of vitreous material and being thereby insulated from direct electrical connection with the metal tube.

2. An electrode device for an electrolytic condenser or rectifier, comprising a filming metal body adapted to be completely submerged in an electrolyte, a lead connected to said body and extending out of the electrolyte, and a tubular device disposed around the lead and having an external surface which with the filming metal body provides an hermetic seal against access of electrolyte to the lead at the point of emergence of the latter and which, being adapted to extend within the rectifier or condenser, is metallic for a substantial portion of its length and is of vitreous material at another portion within the electrolyte when the electrode device is inserted in the latter, said filming metal body being secured to the tubular device in hermetic contact with the surface of vitreous material, and being thereby insulated from direct electrical connection with the aforesaid metallic portion.

3. Electrolytic apparatus of the condenser and rectifier class, having an electrolyte, and an electrode device extending into the electrolyte, comprising a metallic supporting member, an electrode element including a body of filming metal, and means securing the electrode element to the metallic supporting member with the filming metal insulated from direct electrical connection with said metallic supporting member, said means comprising a thin adherent layer of vitreous material located at a part of the metallic supporting member nearest the electrode element, with outer portions of the supporting member surface free of said vitreous material, said layer of vitreous material being disposed intermediate the metallic supporting member and an adjacent surface of the electrode element, and adhering to the said member and the said surface of the electrode element.

4. The electrolytic apparatus of claim 3 wherein the electrode element includes a porcelian member to which the filming metal body is attached, and wherein the electrode element surface to which the vitreous layer adheres is a surface of said porcelain member.

5. The electrolytic apparatus of claim 3 wherein the layer of vitreous material comprises a coating of vitreous enamel around an end portion of the metallic supporting member, and wherein the electrode element surface in adherence with the vitreous layer is provided by the filming metal body cast around and against the enamel coating and hermetically sealing the end of the supporting member.

6. An electrode device for an electrolytic condenser or rectifier, comprising a metal tube adapted to extend into the condenser or rectifier, an electrode element including a body of filming metal, a lead electrically connected to the body of filming metal and extending therefrom through the metal tube, and means securing the electrode element to the end of the metal tube with the filming metal insulated from direct electrical connection with the tube, whereby the lead is hermetically sealed against access thereto by the electrolyte in which the electrode device is immersed, said means comprising a thin adherent layer of vitreous material located at a part of said metal tube near its end, with outer portions of the tube surface free of said vitreous material, said layer of vitreous material being disposed intermediate the metal tube and an adjacent surface of the electrode element, and adhering to the tube and the said surface of the electrode element.

7. In an electrode device for an electrolytic condenser or rectifier, a metal tube adapted to extend into the condenser or rectifier, a porcelain tube extending into an end of the metal tube and hermetically sealed thereto, and a body of filming metal on the porcelain tube, hermetically sealing the outer end of the same and spaced from the metal tube so as to be insulated therefrom.

8. An electrode device for an electrolytic condenser or rectifier, comprising a metal tube adapted to extend into the condenser or rectifier, a porclain tube having a vitreous surface, extending into an end of the metal tube and hermetically sealed thereto by a layer of glaze, a body of filming metal on the porcelain tube, hermetically sealing the outer end of the same and spaced from the metal tube so as to be insulated therefrom, and a conducting lead electrically connected to the body of filming metal and extending therefrom through said tubes.

9. A device for the purpose described, comprising a metal tube having an end tapered inside, a tapered porcelain tube fitted in the tapered end of the metal tube and hermetically sealed thereto by an interposed layer of glaze, a body of filming metal cast over the outer end of the porcelain tube and spaced from the metal tube so as to be insulated therefrom, and a conducting lead electrically connected to the body of filming metal and extending therefrom through said tubes.

10. A device for the purpose described, comprising a metal tube having an end inwardly tapered inside, a tapered porcelain tube fitted into the tapered end of the metal tube and hermetically sealed thereto, the taper on the porcelain tube beginning outside of the metal tube at a point spaced from the edge of the latter, and a body of filming metal cast in the form of a cap over the end of the porcelain tube and hermetically sealed thereto by an interposed layer of glaze, the edge of the cap terminating substantially at the beginning of the said taper on the porcelain tube.

11. A device for the purpose described, comprising a metal tube having an end inwardly tapered inside, a tapered porcelain tube fitted into the tapered end of the metal tube and hermetically sealed thereto, the outer portion of the porcelain tube tapering also toward its outer end from a point spaced from the edge of the metal tube, and a cap of filming metal cast on the porcelain tube with its edge terminating substantially at the juncture of the two tapers on the porcelain tube.

12. In an electrode device for an electrolytic condenser or rectifier, a metal tube adapted to extend into the condenser or rectifier, a porcelain tube having a vitreous surface, extending into an end of the metal tube and hermetically sealed thereto by a layer of glaze solidified from fusion, the metal tube being under tension thereon, and a body of filming metal on the porcelain tube, hermetically sealing the outer end of the same and spaced from the metal tube so as to be insulated therefrom, and a conducting lead electrically connected to the body of filming metal and extending therefrom through said tubes.

13. In a device for the purpose described, a metal tube having an end tapered inside, a tapered porcelain tube fitted in the tapered end of the metal tube and hermetically sealed thereto by an interposed layer of glaze solidified from fusion between the tubes, and the metal tube being in tension on the solidified glaze, and a body of filming metal cast over the outer end of the porcelain tube and spaced from the metal tube so as to be insulated therefrom.

14. An electrolytic apparatus of the condenser and rectifier class, having an electrolyte, and a terminal device comprising a metal tube extending into the electrolyte from outside of the same and having on its submerged portion a coating of enamel, and body of filming metal carried by the said submerged portion of the metal tube and insulated from direct electrical connection therewith by the enamel, the filming metal hermetically fitting the enamel and the metal tube being in electrical connection with the electrolyte.

15. Electrolytic apparatus of the condenser and rectifier class, having an electrolyte, and an electrode device extending into the electrolyte, comprising a metallic member coated with a thin adherent layer of enamel and having a supporting portion extending through and out of the electrolyte which is free of said enamel coating and which is electrically connected with the electrolyte, and a body of filming metal secured to the enamelled member and hermetically fitting the enamel thereon, said body of filming metal being thereby insulated from direct electrical connection with said metallic member.

16. An electrode device for an electrolytic condenser or rectifier, including a metallic member having a thin adherent enamel coating providing an insulating sheath therefor, and a metal electrode member surrounding the first-mentioned coated member and gripping the enamel coating with hermetic contact, said electrode member enclosing an end of the enamelled metallic member and being insulated from direct electrical connection with the metallic member, and said device also including means comprising a rigid insulating part extending within the electrode member for resisting and reducing compression stresses exerted by said electrode member on the enamel coating, said part being disposed adjacent the end of the metallic member for facilitating insulation of the electrode member from said end.

17. Electrolytic apparatus of the condenser and rectifier class, having an electrolyte, and having extending into the electrolyte an electrode and terminal device for sealing the lead of the electrode of the same against access thereto by the electrolyte in which the electrode is immersed, said device including a tubular metallic member having a thin insulating sheath surrounding and closely fitting the member for direct reinforcement thereby, said sheath comprising an adherent coating of enamel, and a body of electrode metal secured to the sheathed member in hermetic contact with the sheath and enclosing the end of the member and insulated from direct electrical connection with the metal of said member, said terminal device also including a lead connected to the electrode metal body and disposed within and insulated from the sheathed member, said electrode metal body and said sheath providing a sealed electrolyte-proof surface for the terminal device when the latter is inserted in the electrolyte, whereby access of electrolyte to the lead is prevented, and said tubular metallic member having a supporting portion therefor, remote from its aforesaid end, which is in direct electrical contact with the electrolyte.

18. A terminal device for an electrolytic condenser or rectifier, comprising a metallic tubular member having an adherent coating of enamel around a portion adjacent its end, a lead extending through the tubular member and insulated therefrom, and an electrode element secured to the enamelled tubular member, said element including a body of filming metal gripping the enamel coating with hermetic contact, said filming metal being electrically connected with the lead and being insulated from direct electrical connection with the metallic tubular member, and said element also including an insulating part enclosed within the filming metal body and spacing and insulating the filming metal from the end of the metallic tubular member.

RALPH D. MERSHON.